United States Patent [19]

Sakuma et al.

[11] Patent Number: 5,452,160
[45] Date of Patent: Sep. 19, 1995

[54] MODE SWITCHING TRANSMITTING MECHANISM FOR A TAPE PLAYER

[75] Inventors: Ichiro Sakuma, Toda; Chang-Jong, Oh, Oomiya; Ken Yakame, Tamaho; Takao Higuchi, Kawaguchi, all of Japan

[73] Assignee: Tokyo Pigeon Co., Ltd., Tokyo, Japan

[21] Appl. No.: 124,209

[22] Filed: Sep. 21, 1993

[30] Foreign Application Priority Data

Sep. 25, 1992 [JP] Japan ............... 4-072893 U
Nov. 10, 1992 [JP] Japan ............... 4-083904 U
Nov. 17, 1992 [JP] Japan ............... 4-085228 U

[51] Int. Cl.⁶ .......................... G11B 5/54; G11B 15/00
[52] U.S. Cl. ............................ 360/105; 360/96.3
[58] Field of Search ............... 360/105, 104, 96.03, 360/96.05, 106, 137, 90; 242/201, 202

[56] References Cited

U.S. PATENT DOCUMENTS

| | | | |
|---|---|---|---|
| 4,680,659 | 7/1987 | Imai ............... | 360/96.3 |
| 4,843,499 | 6/1989 | Ogawa ............. | 360/96.3 |
| 4,925,127 | 5/1990 | Outou et al. ...... | 242/201 |
| 4,956,734 | 9/1990 | Kamijo ............ | 360/105 |
| 5,031,471 | 7/1991 | Watanabe .......... | 74/354 |
| 5,062,013 | 10/1991 | Gotoh ............. | 360/90 |
| 5,144,507 | 9/1992 | Kurita ............ | 360/96.3 |

Primary Examiner—John H. Wolff
Assistant Examiner—Allen Cao
Attorney, Agent, or Firm—Jones, Tullar & Cooper

[57] ABSTRACT

A mode switching transmitting mechanism for a tape player according to the present invention, in which a play mode and a fast forward/fast rewinding mode is switched by sliding a transmitting gear engaged with a driving gear in a direction of an axial line, makes it possible to construct a small and thin switching mechanism. According to the present invention a first gear having a greater diameter on the driving side and a first gear having a smaller diameter have a common shaft. A second gear having a greater diameter on the driven side and a second gear having a smaller diameter are supported slidably on a shaft on a pivoting arm side and held, energized towards one direction of an axial line by a spring. In order to realize the play mode, a lever is pushed. Then an operating lever is forwarded and a wedge portion thereof is engaged with a conical plateau portion formed in a wedge portion of the gear having a greater diameter. In this way the second gear having a greater diameter and the second gear having a smaller diameter are slid against a force of a spring to form a transmission path to the reel gear.

2 Claims, 10 Drawing Sheets

FF MODE

MODE SWITCHING TRANSMITTING MECHANISM FOR A TAPE PLAYER

FIELD OF THE INVENTION

The present invention relates to an improvement of a mode switching and transmitting mechanism for a tape player.

BACKGROUND OF THE INVENTION

FIG. 10 shows an outlined construction of a usual prior art mode switching transmitting mechanism. In the same figure, in order to facilitate understanding relation to the construction of the present invention, various corresponding parts are indicated by the same reference numerals as those used in figures representing an embodiment of the present invention.

In FIG. 10, 18a and 18b are a right and a left reel gears, respectively; 27 and 32 are coaxial driving gears, whose shaft is indicated by 30a; 22 and 22a are coaxial driven gears; and 20 is an idle gear. The gear 22 having a greater diameter and the gear 22a having a smaller diameter described above are supported rotatably by a pivoting arm (not indicated in the figure) and pivoted around the shaft 30a. The reel gears 18a and 18b as well as the idle gear 20 are supported rotatably at fixed positions.

At switching the different modes, that is, tape fast forward (FF) and rewinding (REW) or play (FWD) and play (RVS), the gear 22 is engaged with either one of the reel gear 18a and the idle gear 20 by pivoting displacement of the pivoting arm. Since the modes FF and REW or FWD and RVS are switched by pivoting displacement of the gear 22, as described above, it is necessary to dispose the idle gear for either one of the reel gears.

Further, in connection with an intrusion angle of gears, the pivotably displaced gear 22 is disposed at a position protruding upward from a line connecting the centers of the reel gears 18a and 18b. Owing to this construction it is possible to obtain advantages that the intruding force of the gear 22 is relatively small, that there is no risk to rotate the gear 22, when the gear 22 is disengaged from the idle gear 20, because the contact angle $\beta$ to the gear 22 is small (an angle around 70° is desirable), and that a small operating force is sufficient, etc.

However, when the mechanism is so constructed that the gear 22 protrudes upward from the line connecting the centers of reel gears 18a and 18b, there are problems that, in a small size tape player, negatively affect space factor as a result, space for accommodating a battery can be taken up, etc.

Therefore, in order to remove the disadvantages on the space described above, another construction, wherein the gear 22 is disposed on the line connecting the centers of the reel gears, as indicated in FIG. 11, is conceivable. However, in this construction, since the contact angle $\beta$ of the gear 22 with respect to the gear 20 is great (greater than 90°), when the gear 22 is disengaged from the gear 20, it rotates more or less the gear 20, and in particular, when the gear 22 is disengaged at the end of the tape, an extremely great force is required. For this reason, lever operation is very heavy.

As the gear switching mechanism described above, there are known heretofore a mechanism, so constructed that the gear is switched through a rotating member linked with sliding of a head plate supporting a head, or having such construction that the gear is switched by thrusting it directly by means of an FF/REW lever, but in the former mechanism larger parts should be used, which requires a large space and on the contrary, in the latter mechanism, the number of parts is increased, which gives rise to higher costs.

OBJECT OF THE INVENTION

A first object of the present invention is to provide a mode switching transmitting mechanism for a tape player, in which disengagement of the gear can be effected smoothly, even if the pivotably displaced gear described above is disposed on the line connecting the centers of the right and the left reel gear.

A second object of the present invention is to provide a mode switching transmitting mechanism for a tape player, in which the gear switching between the driving gear and the driven gear can be effected by simple means.

SUMMARY OF THE INVENTION

In order to achieve the above first object, a mode switching transmitting mechanism for a tape player according to the present invention comprises a driving gear driven by a motor serving as a driving source; a transmitting gear engaged with this driving gear, effecting sliding movement towards an axial line and pivoting movement; a spring energizing this transmitting gear always towards one side of the axial line; a conical plateau portion formed on a boss portion of the transmitting gear stated above; and a head plate, which is slidingly forwarded by a play operation, engaged with the conical plateau portion stated above, moving the transmitting gear to the other side to realize a play mode; and is so constructed that, by a fast forward operation, the head plate stated above is slidingly retreated and at the same time the transmitting gear stated above is switched so as to transmit rotation to a winding reel table, while by a rewinding operation, the head plate stated above is slidingly retreated and at the same time the transmitting gear stated above is switched so as to transmit rotation to a supplying reel table.

In the construction described above, as shown in FIG. 12, the coaxial gears 22 and 22a as well as the idle gear 20 engaged with the gear 22 are supported rotatably on a pivoting plate pivoting around the shaft 30a.

Owing to the construction described above, even if the gear 22 is disposed on the line connecting the centers of the reel gears 18a and 18b, the intruding force between the reel gear 18b and the idle gear 20 is small and the rotational moment of the pivoting plate due to the intruding force is represented by $F_6 \cdot L_4 - F_5 \cdot L_3$, where $F_6$ represents the force in the direction perpendicular to the tooth surface, which is exerted by the gear 20 to the gear 18b and $F_5$ is the resultant force of $F_1$ and $F_2$. Thus it is reduced by $F_5 \cdot L_3$ and therefore a small lever operating force is sufficient.

On the other hand, in order to achieve the above second object, a mode switching transmitting mechanism for a tape player according to the present invention may comprise a driving gear driven by a motor serving a driving source; and a pivoting plate freely pivoting, on which there is disposed a group of driving gears consisting of a third transmitting gear engaged with this driving gear, a first transmitting gear engaged always with this third transmitting gear and a second transmitting gear engaged always with this first transmitting gear; and is so constructed that the pivoting plate stated above is pivoted in a direction so that one of the reel gears is engaged with the first transmitting gear, when rotation should be transmitted to the one of the reel gears, while the pivoting plate stated above is pivoted in another direction so that the other reel gear is engaged with the second transmitting gear, when rotation should be transmitted to the other reel gear.

Owing to the construction described above, the head plate is slid to engage it with the conical plateau portion formed on the boss portion of the transmitting gear, so that the movement of the sliding direction of the head plate is transformed into a force to move the transmitting gear in the other direction against the force of the spring to effect the gear switching.

DETAILED EXPLANATION

Figure 1:
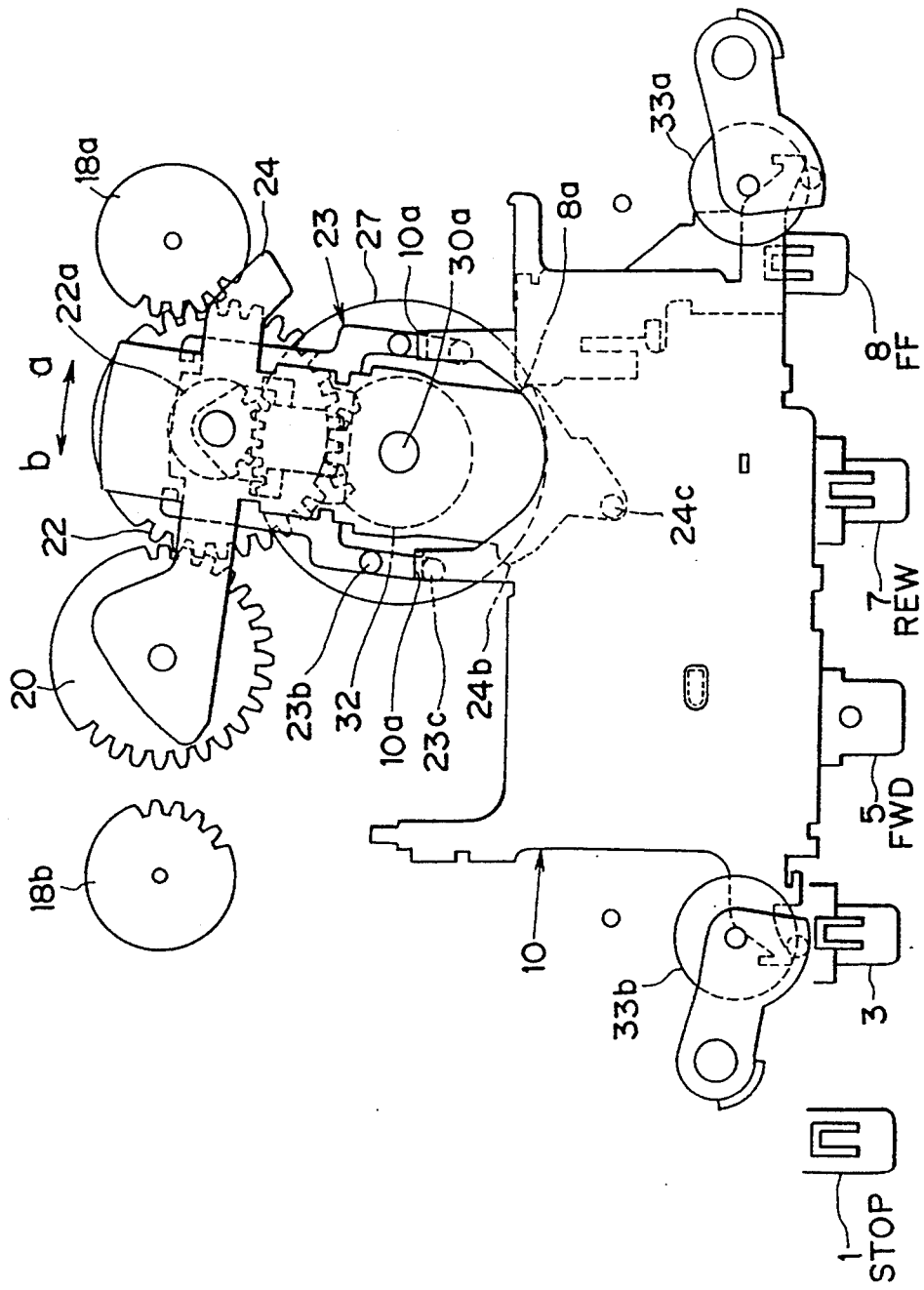
FIG. 1 is a plan view of a mode switching transmitting mechanism in the FF mode, which is an embodiment of the present invention.

FIG. 1: (FF Mode Operation)

In the same FIG., 18a and 18b represent reel gears. 24 is a pivoting plate, which is supported freely pivotably in directions (a–b) around a shaft 30a mounted on a chassis. On the pivoting plate 24 (cf. FIG. 8) there are supported rotatably a gear consisting of a gear 22 having a greater diameter and a gear 22a having a smaller diameter formed in one body, and an idle gear 20, which is always engaged with the gear 22 having a greater diameter described above.

Further there are disposed a gear 27 having a greater diameter and a gear 32 having a smaller diameter formed in one body, which are rotatable around the shaft 30a on the pivoting plate 24 described above.

Figure 7:
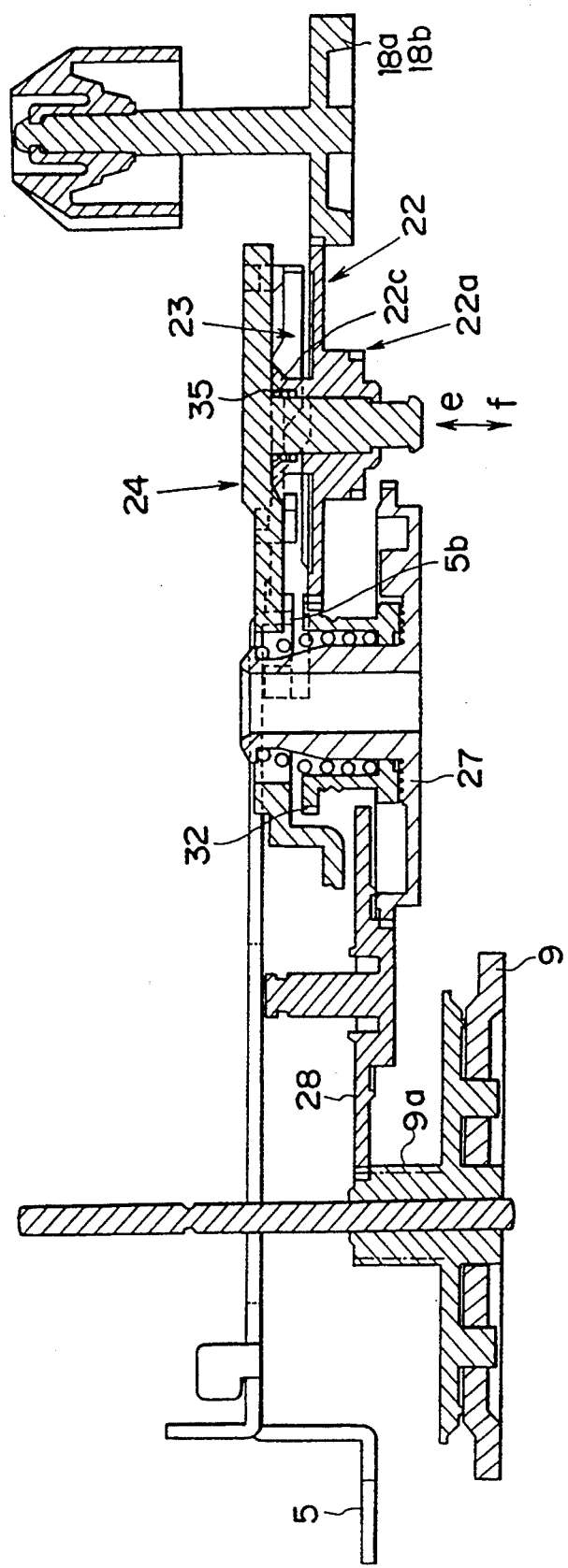
FIG. 7 is a cross-sectional view of the gear transmitting mechanism portion before gear change.
Figure 9:
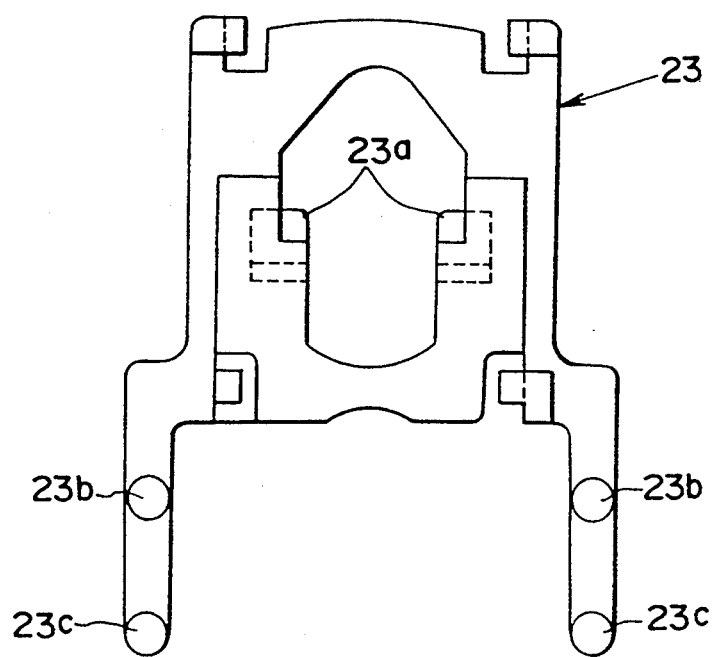
FIG. 9 is a plan view of an operating plate.
Figure 10:
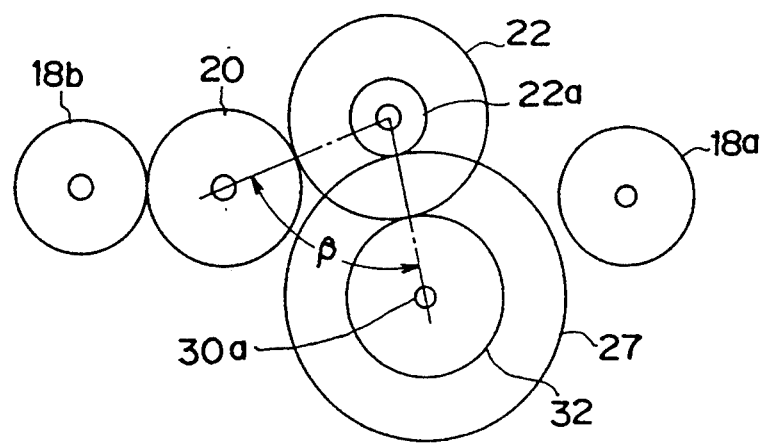
FIG. 10 is an outlined diagram of a prior art mode switching transmitting mechanism.
Figure 11:
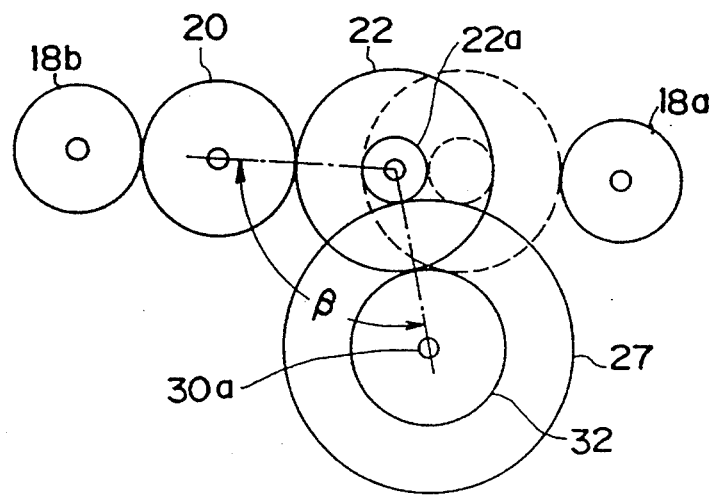
FIG. 11 is an outlined diagram of an example, in which gears are arranged on one line.
Figure 12:
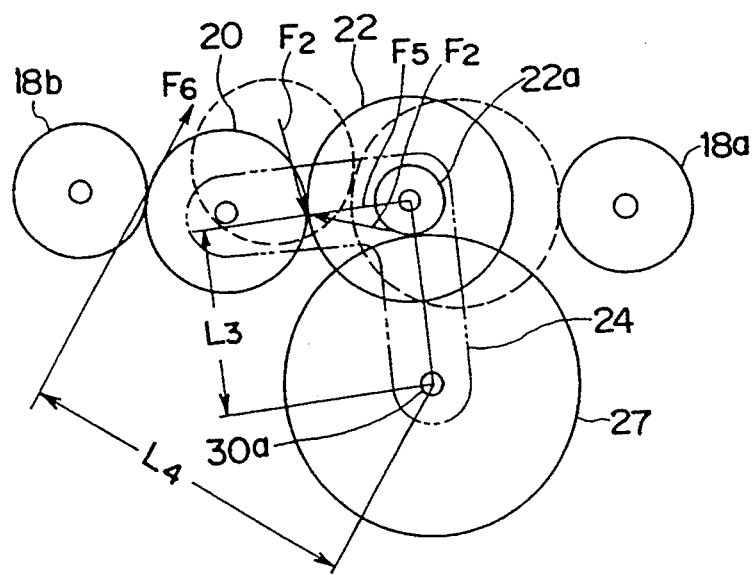
FIG. 12 is an outlined diagram of the mode switching transmitting mechanism according to the present invention.

On the lower side of the pivoting plate 24 there is disposed an operating lever 23 movable both forward and backward. On the operating lever 23 there are formed wedge portions 23a and engaging protrusions 23b and 23c at predetermined positions, as indicated in FIG. 9. When the operating lever 23 is in a retreated position, as indicated in FIG. 7, the gears 22 and 22a formed in one body are in a position, where they are energized by a coil spring 35. In this case, the gear 22 having a greater diameter is engaged with the reel gear 18a, while the gear 22a is engaged with the gear 27 having a greater diameter 27 on the driving side, and thus rotation of a motor not indicated in the figure is transmitted through a path of pulley 9→gear 9a→intermediate gear 28→gear 27 having a greater diameter→ gear 22a having a smaller diameter→gear 22 having a greater diameter →reel gear 18a to realize the FF mode.

Figure 6:
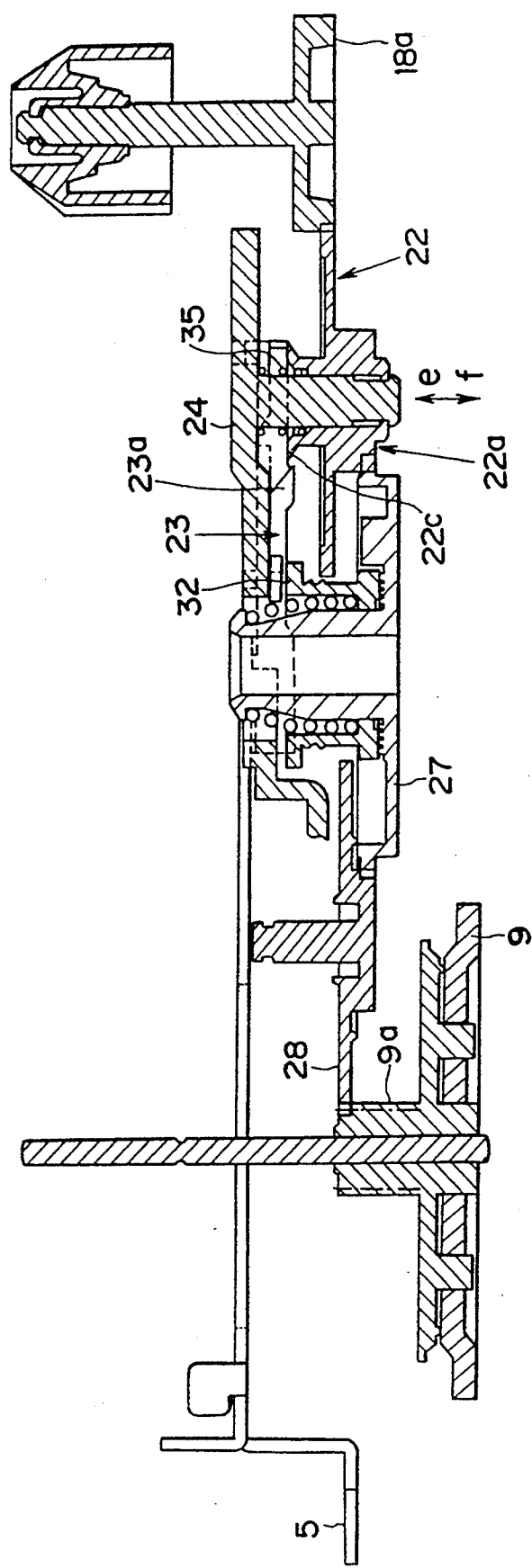
FIG. 6 is a cross-sectional view of a gear transmitting mechanism portion.

Next, as indicated in FIG. 6, when the operating lever 23 is slid to a forwarded position, where one of the wedge portions 23a is engaged with the conical plateau portion 22c formed on a boss on the gear 22 having a greater diameter and slides the gears 22 and 22a formed in one body in the axial direction against the force of the spring 35. Therefore the rotation of the motor is transmitted through a path of gear 32 having a smaller diameter→gear 22 having a greater diameter→reel gear 18a to realize the play (FWD) mode.

Figure 8:
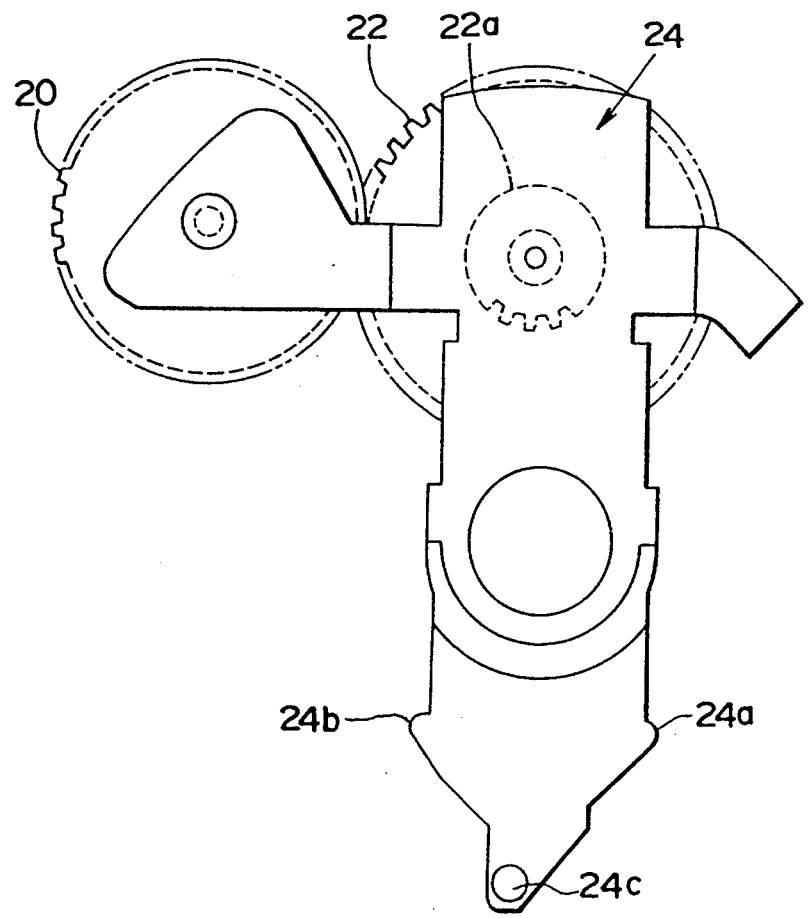
FIG. 8 is a plan view of the pivoting plate supporting the driven gear and the idle gear.

In FIG. 1, 8 represents an operating lever for the FF mode. When it is pushed down, since it thrusts a protruding portion 24a (cf. FIG. 8) on the right side of the pivoting plate 24 by a lever extremity portion 8a thereof, the pivoting plate 24 is pivoted in a direction indicated by an arrow a around the shaft 30a and the gear 22 is engaged with the reel gear 18a (cf. FIG. 7) to realize the FF mode.

Figure 2:
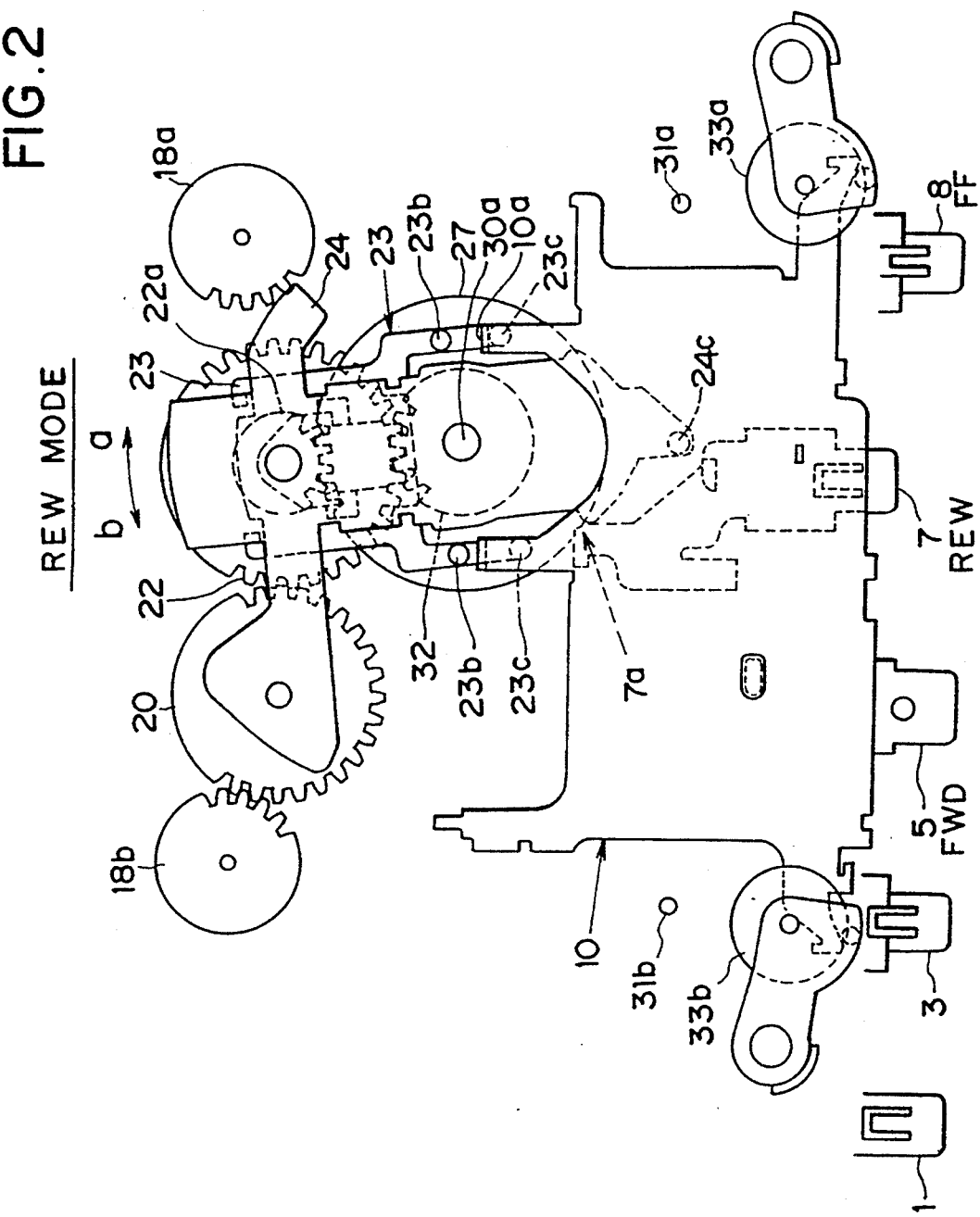
FIG. 2 is a plan view of the transmitting mechanism in the REW mode.

FIG. 2: (REW Mode Operation)

In FIG. 2, 7 represents an operating lever for the REW mode. When it is pushed down, since it thrusts another protruding portion 24b (cf. FIG. 8) on the right side of the pivoting plate 24 by a lever extremity portion 7a thereof, the pivoting plate 24 is pivoted in a direction indicated by an arrow b around the shaft 30a and the idle gear 20 is engaged with the reel gear 18b to realize the REW mode. In this case the gears 27 and 22a are engaged with each other, as indicated in FIG. 7.

Figure 3:
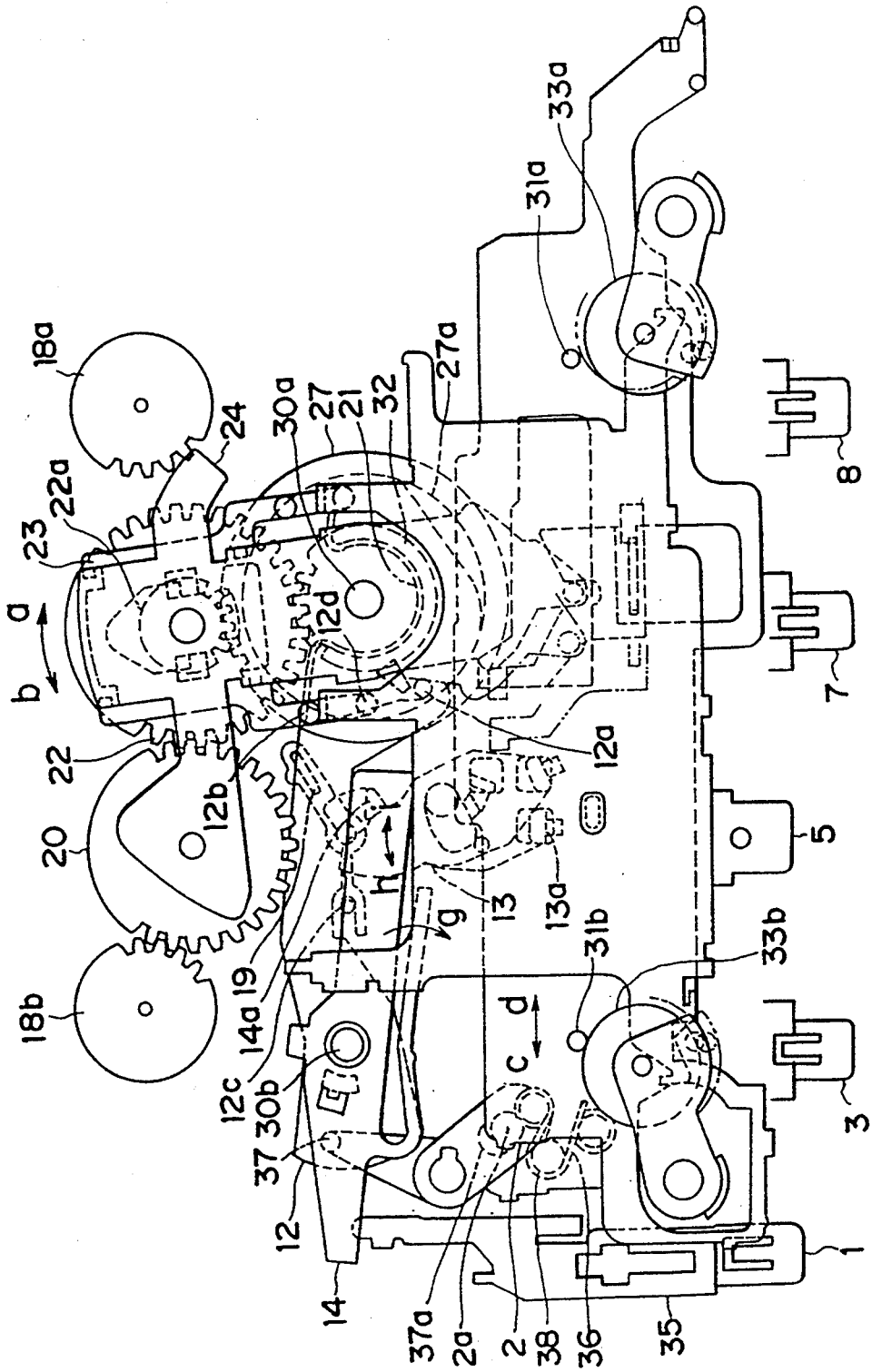
FIG. 3 is a plan view of the transmitting mechanism in the play mode (FWD→RVS)

FIG. 3: (Auto RVS Mode)

When the tape end is reached at the play mode, an end signal is detected, the mode is changed from the FWD play to the RVS play or from the RVS play to the FWD play.

(1) When the tape is running, since a part 12c of a releasing arm 12 is energized always by a cam portion 27a of a gear 27 and a detection spring 21 pushed slightly so as to be brought into contact with a gear 32 through a detecting arm 19, a part 12a of the releasing arm 12 is pivoted between the part 12a and a part 12d.

(2) When the tape end is reached, since rotation of the gear 32 is stopped, rotation of the detection spring 21 is also stopped, it is rotated to the position of the part 12a by the protruding portion of the gear 27.

(3) The releasing arm 14 is rotated in a direction indicated by an arrow g around a same rotating shaft 30b.

(4) A switching arm is moved in a direction indicated by an arrow from h to i or from i to h by a part 14a of a releasing arm 14.

(5) The slide plate 2 is slid in a direction indicated by an arrow d, when it is in a direction indicated by an arrow c, and in the reverse direction indicated by the arrow c, when it is in the direction indicated by the arrow d, by a part 13a of the switching arm 13.

(6) A pinch roller is pushed so as to be brought into contact with a capstan shaft 31a or 31b so as to change the rotation of the reel alternately by the movement of the slide plate 2.

The FWD play is realized in the case of c, while the RVS play is realized in the case of d.

FIG. 3: (Manual RVS)

(1) When the operating lever 1 is pushed, the releasing arm 14 is rotated in the direction indicated by the arrow g.

(2) Thereafter, similarly to Items 4 to 6 described previously, the mode change FWD→RVS play is alternately effected, every time the lever 1 is pushed.

FIG. 7: (Gear Mechanism)

The gear consisting of the gear 22 having a greater diameter and the gear 22a having a smaller diameter is energized always in a direction indicated by an arrow f by the spring 35. When the lever 8 for the FF mode in FIG. 1, the gear 22 is engaged with the reel gear 18a.

FIG. 6: (Gear Mechanism)

In FIG. 1, when the lever 5 for the FWD mode is pushed, since a protruding portion 10a at the extremity of the head plate 10 thrusts an engaging protrusion 23b of the operating lever 23, the operating lever 23 is forwarded and the wedge portion 23a is engaged with the conical plateau portion 22c of the gear 22 so that the gears 22 and 22a are slid in a direction indicated by an arrow e against the force of the spring 35. Therefore the gear 22 is engaged with the gear 32 so that the speed is reduced and so that rotation is transmitted to one of the reel gears 18b through the other reel gear 18a or the idle gear 20.

Figure 4:
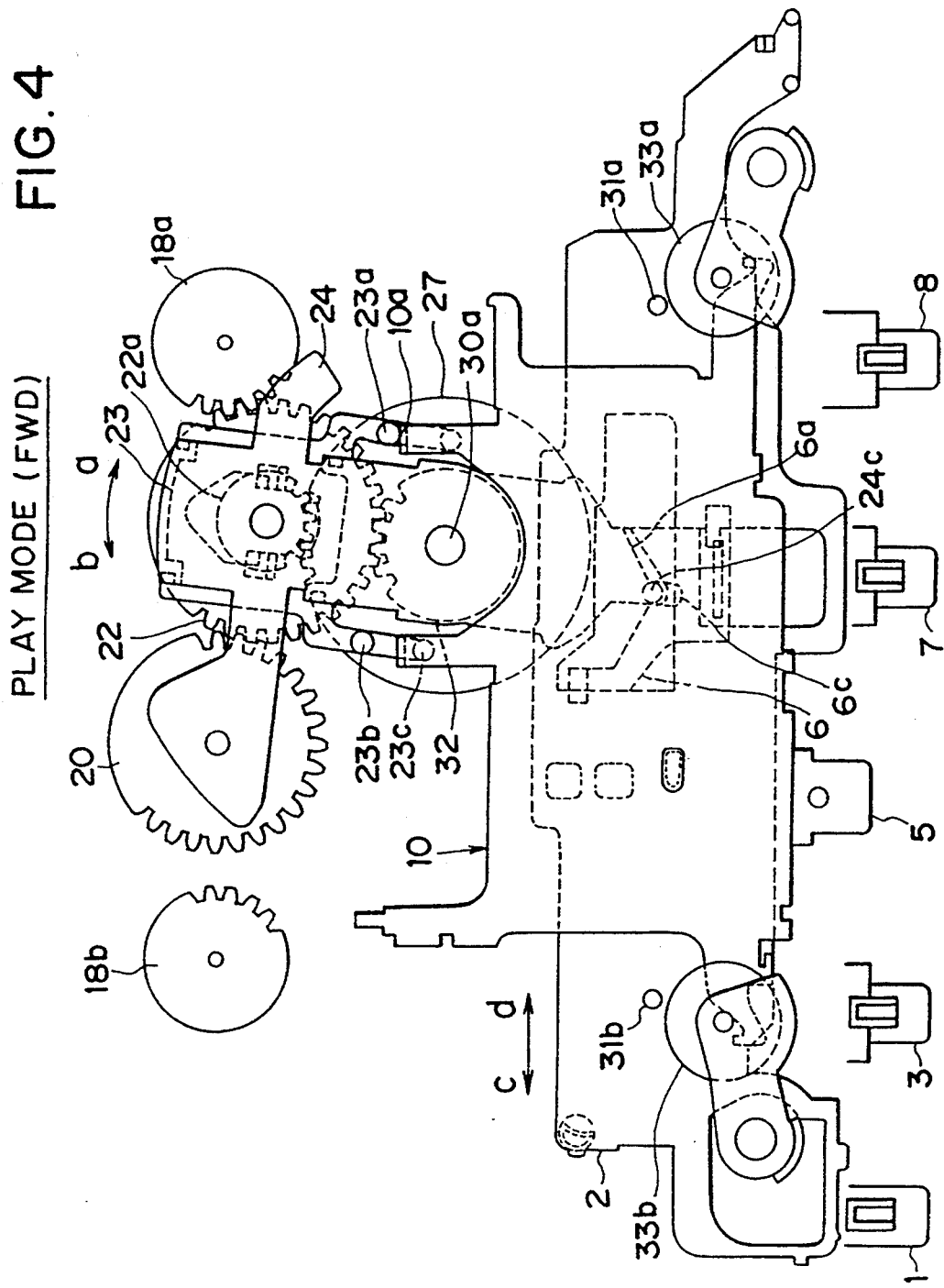
FIG. 4 is a plan view of the transmitting mechanism in the play mode (FWD)

FIG. 4: (FWD Play Mode)

When the slide plate 2 is located in a direction indicated by an arrow c:

(1) when the lever 5 for play mode is pushed, the head plate 10 formed in one body is forwarded;

(2) by the forward of the head plate 10, the operating lever 23 is forwarded and the gear 22 is moved so as to be engaged with a gear 32 so that a rotation transmitting path to the reel gear 18a is formed;

(3) at the same time an auxiliary slide plate 6 is forwarded together with the head plate 10 and the protrusion 24c at the extremity of the pivoting plate 24 is pushed along an inclined portion 6a so as to be fixed in a groove formed in the auxiliary slide plate 6;

(4) the pivoting plate 24 is pivoted in a direction indicated by an arrow a around the shaft 30a so that the gear 22 is engaged with the reel gear 18a; and (5) at the same time as the forward of the head plate 10, the pinch roller 33a is brought into contact with the capstan shaft 31a to realize the FWD play.

Figure 5:
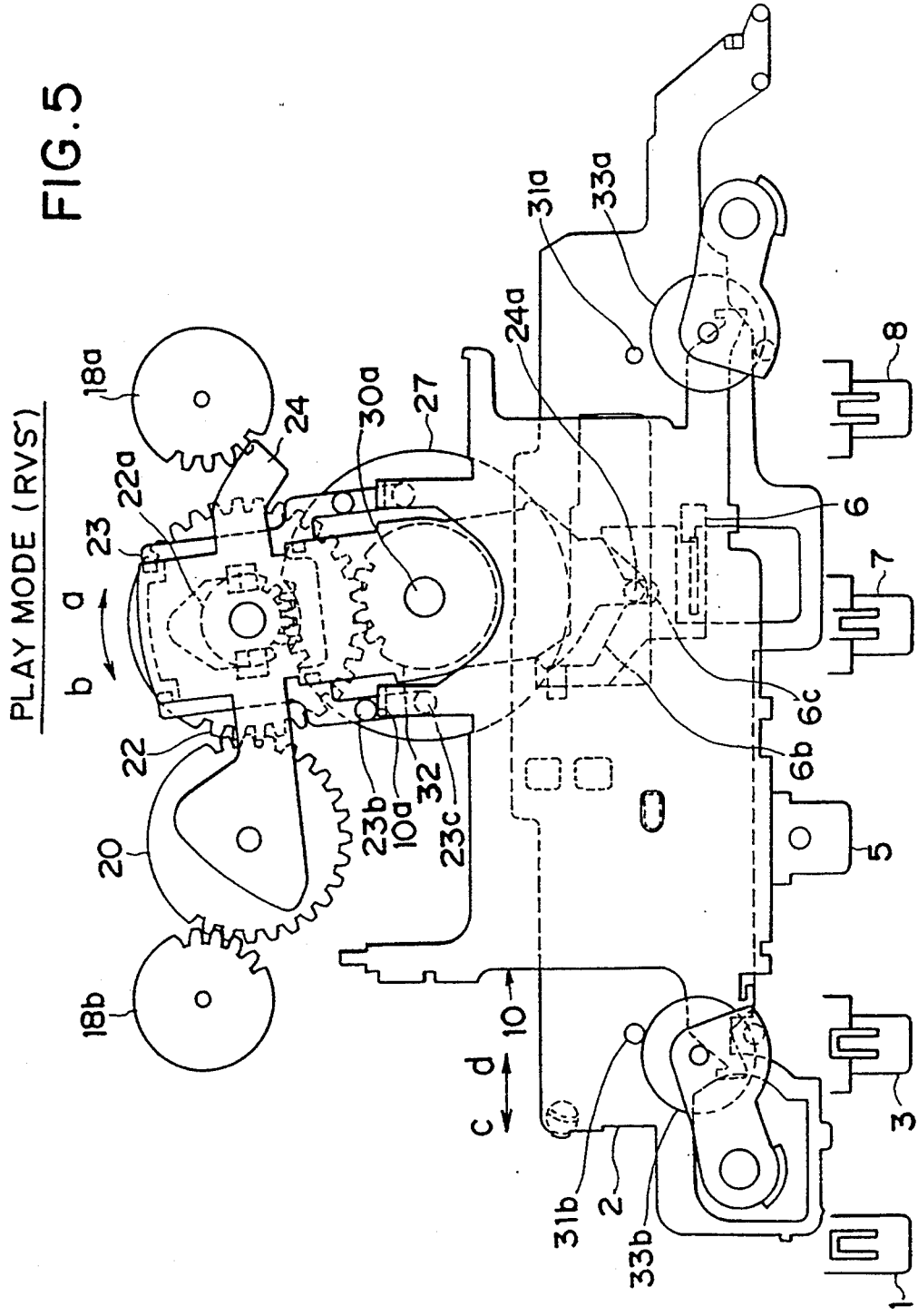
FIG. 5 is a plan view of the transmitting mechanism in the play mode (RVS)

FIG. 5: (RVS Play Mode Operation)

When the slide plate 2 is located in a direction indicated by an arrow d:

(1) When the lever 5 is pushed, the head plate 10 formed in one body is forwarded;

(2) the protruding portion 10a at the extremity of the head plate 10 pushes the engaging protrusion 23b of the operating lever 23;

(3) at that time, as explained previously, the gear 22 is moved and a rotation transmitting path of gear 32→gear 22→idle gear 20→reel gear 18b is formed;

(4) at the same time the auxiliary slide lever 6 is also forwarded by the operation of the lever 5 and pushes the protruding portion 24c at the extremity portion 24c of the pivoting plate 24 along the inclined portion 6a so as to be fixed in the groove formed in the auxiliary slide plate 6;

(5) the pivoting plate 24 is pivoted in a direction indicated by an arrow b around the shaft 30a so that the idle gear 20 is engaged with the reel gear 18b;

(6) at the same time as the forward of the head plate 10, the pinch roller 33b is brought into contact with the capstan shaft 31b to realize the RVS play; and (7) when the movement to the predetermined position is terminated by the switching movement of the slide plate 2, the lever 37 is energized by a spring 38. Since a boss 2a of the slide plate 2 is in an elongated hole 37a formed in the lever 37, the slide plate is energized always by the reversing spring 38 through the lever 37 in the direction indicated by the arrow c at the FWD play and in the direction indicated by the arrow d at the RVS play.

Stop Operation:

When the lever 3 is pushed at the different modes, a lock plate not indicated in the figure is operated to release the lock of the different levers and thus the stop mode is realized.

As explained above, according to the present invention, it is possible to obtain a mode switching transmitting mechanism for a tape player capable of effecting disengagement of gears smoothly, even if pivoting transmitting gears are disposed on a line connecting the right and left reel gears. Consequently it is possible to construct a player, which is advantageous for a battery space, etc., because the whole size of a cassette is small and in particular the size behind the center of the cassette can be reduced. Further it is possible to obtain a small and thin gear switching mechanism for selecting one of the play rotation and the FF/REW rotation. Particularly, since the engaging portion with the sliding head plate is formed at a part close to the center of the transmitting gears, it is possible to reduce the load at the gear switching operation.

What is claimed is:

1. A mode switching transmitting mechanism for an auto-reverse type tape player, mounted within a chassis, comprising:

first and second reel gears;

first and second transmitting gears aligned coaxially and affixed to one another and slidably mounted on a first shaft, wherein said first shaft is mounted on the chassis;

an idle gear, engaged with said second transmitting gear and mounted on a second shaft;

a pivoting plane on which said transmitting gears and said idle gear are supported by said first and second shafts;

a spring for energizing said transmitting gears always toward one direction along said first shaft;

a conical plateau portion formed on a boss portion of the first transmitting gear;

first and second driving gears aligned coaxially and affixed to one another and mounted on a third shaft;

said pivoting plate being affixed to and rotatable around said third shaft a head plate slidably movable within the chassis and including a wedge;

play mode selection means for slidingly forwarding the head plate to engage said head plate wedge with the conical plateau portion so that said first and second transmitting gears are slid along said first shaft in a first direction against a force of the spring and the first transmitting gear engages with the second driving gear, and for rotating said pivoting plate to cause the second transmitting gear to engage with the first reel gear directly or with the second reel gear through the idle gear;

fast forward/rewinding mode selection means for slidingly retreating the head plate wedge from said conical plateau portion so that said first and second transmitting gears are slid in a second direction, opposite said first direction, along said first shaft by said force of the spring and the second transmitting gear engages with the first driving gear and for rotating said pivoting plate to cause the first transmitting gear to engage with the first reel gear directly or with the second reel gear through the idle gear.

2. A mode switching transmitting mechanism for a tape player according to claim 1 wherein said first transmitting gear first shaft is disposed on a line connecting the centers of the first and second reel gears.

* * * * *